(12) United States Patent
Amaratunga et al.

(10) Patent No.: US 9,997,923 B2
(45) Date of Patent: *Jun. 12, 2018

(54) GRID SYNCHRONISATION

(71) Applicant: SolarCity Corporation, San Mateo, CA (US)

(72) Inventors: Gehan Anil Joseph Amaratunga, Cambridge (GB); Lesley Chisenga, Redwood Shores, CA (US); Andrabadu Viraj, Cambridge (GB)

(73) Assignee: SolarCity Corporation, San Mateo, CA (US)

( * ) Notice: Subject to any disclaimer, the term of this patent is extended or adjusted under 35 U.S.C. 154(b) by 829 days.

This patent is subject to a terminal disclaimer.

(21) Appl. No.: 13/656,641

(22) Filed: Oct. 19, 2012

(65) Prior Publication Data

US 2013/0134790 A1    May 30, 2013

Related U.S. Application Data

(63) Continuation of application No. 12/809,436, filed as application No. PCT/GB2008/051216 on Dec. 19, 2008.

(30) Foreign Application Priority Data

Dec. 20, 2007    (GB) .................................. 0724825.5
Dec. 20, 2007    (GB) .................................. 0724828.9

(51) Int. Cl.
*H02J 3/40*    (2006.01)
*H02J 3/50*    (2006.01)

(52) U.S. Cl.
CPC ................. *H02J 3/40* (2013.01); *H02J 3/50* (2013.01); *Y10T 307/511* (2015.04); *Y10T 307/707* (2015.04); *Y10T 307/735* (2015.04)

(58) Field of Classification Search
CPC ........... H02J 3/40; H02J 3/50; Y10T 307/707; Y10T 307/735; Y10T 307/511
(Continued)

(56) References Cited

U.S. PATENT DOCUMENTS 2,367,925 A    1/1945    Brown
3,723,769 A    3/1973    Collins
(Continued)

FOREIGN PATENT DOCUMENTS

DE    3236071    1/1984
EP    0576271    12/1993
(Continued)

OTHER PUBLICATIONS

Portions of prosecution history of U.S. Appl. No. 12/809,436, dated Sep. 28, 2012, Amaratunga, Gehan Anil Joseph, et al.
(Continued)

*Primary Examiner* — Jared Fureman
*Assistant Examiner* — Emmanuel R Dominique
(74) *Attorney, Agent, or Firm* — Kilpatrick Townsend & Stockton LLP

(57) ABSTRACT

The invention relates to a grid synchronizer for connecting an AC output of a power converter to the AC grid mains. In one aspect the invention provides a grid synchronizer comprising an inverter controller to control an AC output of the inverter, the controller including a receiver to receive grid data from a grid sensor location remote from said inverter. In another aspect we describe techniques for rapid removal of charge from a control terminal of a power switching device such as a MOSFET, IGBT or Thyristor using a particular driver circuit.

17 Claims, 14 Drawing Sheets

(58) Field of Classification Search
USPC .............................................. 307/87; 322/24
See application file for complete search history.

(56) References Cited

U.S. PATENT DOCUMENTS

| | | | |
|---|---|---|---|
| 4,104,687 A | 8/1978 | Zulaski | |
| 4,321,581 A | 3/1982 | Tappeiner et al. | |
| 4,626,983 A | 12/1986 | Harada et al. | |
| 4,772,994 A | 9/1988 | Harada et al. | |
| 5,040,105 A * | 8/1991 | Dhyanchand | H02M 7/49 322/28 |
| 5,083,039 A * | 1/1992 | Richardson | F03D 7/0272 290/44 |
| 5,404,059 A | 4/1995 | Löffler | |
| 5,412,558 A | 5/1995 | Sakurai et al. | |
| 5,504,449 A | 4/1996 | Prentice | |
| 5,576,941 A | 11/1996 | Nguyen et al. | |
| 5,719,758 A | 2/1998 | Nakata et al. | |
| 5,734,565 A | 3/1998 | Mueller et al. | |
| 5,930,131 A | 7/1999 | Feng | |
| 5,963,078 A | 10/1999 | Wallace | |
| 5,982,645 A | 11/1999 | Levran et al. | |
| 6,219,623 B1 * | 4/2001 | Wills | H02J 3/383 290/40 B |
| 6,311,137 B1 | 10/2001 | Kurokami et al. | |
| 6,404,655 B1 * | 6/2002 | Welches | H02M 7/4807 363/17 |
| 6,429,546 B1 | 8/2002 | Ropp et al. | |
| 6,933,714 B2 | 8/2005 | Fasshauer et al. | |
| 7,042,110 B2 * | 5/2006 | Mikhail | F03D 7/0224 290/40 C |
| 7,061,211 B2 | 6/2006 | Satoh et al. | |
| 7,095,597 B1 | 8/2006 | Cousineau | |
| 7,183,667 B2 | 2/2007 | Colby et al. | |
| 7,193,872 B2 | 3/2007 | Siri | |
| 7,479,774 B2 | 1/2009 | Wai et al. | |
| 7,626,834 B2 | 12/2009 | Chisenga et al. | |
| 8,139,382 B2 | 3/2012 | Zhang et al. | |
| 8,310,101 B2 | 11/2012 | Amaratunga et al. | |
| 8,369,113 B2 | 2/2013 | Rodriguez | |
| 2001/0056330 A1 * | 12/2001 | Wills | H02J 3/383 702/60 |
| 2003/0080741 A1 | 5/2003 | LeRow et al. | |
| 2003/0164695 A1 | 9/2003 | Fasshauer et al. | |
| 2005/0105306 A1 | 5/2005 | Deng et al. | |
| 2005/0135031 A1 * | 6/2005 | Colby | H02J 3/42 361/78 |
| 2005/0153174 A1 * | 7/2005 | Harada | H01M 8/0276 429/432 |
| 2005/0179420 A1 * | 8/2005 | Satoh | F01D 15/10 322/24 |
| 2006/0034106 A1 * | 2/2006 | Johnson | H02M 7/538 363/97 |
| 2007/0081371 A1 | 4/2007 | Wittenbreder, Jr. | |
| 2007/0271006 A1 * | 11/2007 | Golden | H02J 3/14 700/295 |
| 2008/0285317 A1 | 11/2008 | Rotzoll | |
| 2008/0291707 A1 | 11/2008 | Fang | |
| 2008/0304296 A1 | 12/2008 | NadimpalliRaju et al. | |
| 2009/0021877 A1 * | 1/2009 | Fornage | H02J 3/383 361/78 |
| 2009/0080226 A1 * | 3/2009 | Fornage | G05F 1/67 363/74 |
| 2010/0157632 A1 | 6/2010 | Batten et al. | |
| 2011/0273015 A1 | 11/2011 | Adest et al. | |
| 2013/0235637 A1 | 9/2013 | Rodriguez | |

FOREIGN PATENT DOCUMENTS

| | | |
|---|---|---|
| EP | 1187291 | 3/2002 |
| EP | 1 837 985 A2 | 9/2007 |
| GB | 2415841 | 4/2006 |
| GB | 2444528 | 6/2008 |
| GB | 2455754 | 6/2009 |
| GB | 2455755 | 6/2009 |
| JP | 2004/312994 | 11/2004 |
| WO | WO 2006/048688 | 5/2006 |
| WO | WO 2009/081205 | 7/2009 |
| WO | WO 2012/125278 | 9/2012 |

OTHER PUBLICATIONS

Portions of prosecution history of GB0724825, dated Apr. 9, 2010, Enecsys Limited.
Portions of prosecution history of GB0724828, dated Mar. 10, 2010, Enecsys Limited.
International Search Report and Written Opinion of PCT/GB2008/051216, dated Jul. 24, 2009, Enecsys Limited.
International Preliminary Report on Patentability of PCT/GB2008/051216, dated Jun. 22, 1010, Enecsys Limited.
Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.
Cordonnier, Charles-Edouard, et al., "Application Considerations for Sensefet Power Mosfet Devices," PCI Proceedings, May 11, 1987, pp. 47-65.
Marra, Enes Gonçalves et al., "Self-Excited Induction Generator Controlled by a VS-PMW Converter Providing High Power-Factor Current to a Single-Phase Grid," Proceedings of the 24th Annual Conference of IEEE, Aug. 31-Sep. 4, 1998, pp. 703-708, vol. 2, IEEE.
Naik, R., et al., "A Novel Grid Interface for Photovoltaic, Wind-Electric, and Fuel-Cell Systems with a Controllable Power Factor of Operation," Applied Power Electronics Conference and Exposure, Mar. 5-9, 1995, pp. 995-998, IEEE.
Nonaka, Sakutaro, et al., "Interconnection System with Single Phase IGBT PWM CSI Between Photovoltaic Arrays and the Utility Line," Industry Applications Society Annual Meeting, Oct. 7-12, 1990, pp. 1302-1307, IEEE.
Petkanchin, L., "Processes Following Changes of Phase Angle Between Current and Voltage in Electric Circuits," IEEE Power Engineering Review, Aug. 1999, pp. 59-60, vol. 19, Issue 8, IEEE.
Rodriguez, C., et al., "Dynamic Stability of Grid-Connected Photovoltaic Systems," Power Engineering Society General Meeting, Jun. 6-10, 2004, 7 pages, IEEE.
Sun, Xiaofeng, et al., "A Research on Photovoltaic Energy Controlling System with Maximum Power Point Tracking," Proceedings of the Power Conversion Conference-Osaka, Apr. 2-5, 2002, pp. 822-826, vol. 2, IEEE.
Portions of prosecution history of U.S. Appl. No. 13/748,375, dated Apr. 2, 2014, Enecsys Limited.
Portions of prosecution history of U.S. Appl. No. 11/718,879, dated Jan. 3, 2013, Enecsys Limited.
International Search Report and Written Opinion for PCT/GB2005/050197, dated Feb. 14, 2006, Enecsys Limited.
International Preliminary Report on Patentability for PCT/GB2005/050197, dated May 8, 2007, Enecsys Limited.
Examination Report dated Mar. 31, 2016 for related European Patent Application No. 20080865007, 7 pages.

* cited by examiner ced lifetime
GRID SYNCHRONISATION

CLAIM OF BENEFIT TO PRIOR APPLICATIONS

This Application is a continuation application of U.S. patent application Ser. No. 12/809,436, filed Nov. 17, 2010, now published as U.S. Publication 2011/0049990. U.S. patent application Ser. No. 12/809,436 is a national stage application of PCT Application PCT/GB2008/051216, filed Dec. 19, 2008, now published as WO 2009/081205. PCT Application PCT/GB2008/051216 claims the benefit of United Kingdom Patent Applications GB 0724825.5 and GB 0724828.9, both filed Dec. 20, 2007. U.S. Publication 2011/0049990 is incorporated herein by reference.

FIELD OF THE INVENTION

The invention relates to power generation, and in particular to a grid synchroniser for connecting an AC output of a power converter to the AC grid mains. The invention also relates to driver circuits, in particular for power semiconductor switching devices of the type that are employed in ac (alternating current) inverters. More particularly aspects of the invention relate to techniques for rapid removal of charge from a control terminal of a power switching device such as a MOSFET (Metal Oxide Semiconductor Field Effect Transistor) IGBT (Insulated Gate Bipolar Transistor) or Thyristor.

BACKGROUND TO THE INVENTION

Attempts have been made previously to directly couple switching semiconductor devices to the grid in order to maintain phase synchronisation and simplify system design. One of the key problems is how to rapidly remove gate charge and at the same time minimise power loss in the driving circuit. If charge is not removed rapidly from the gate terminal a shoot-through problem results and a ground fault develops on the grid. One possible solution is to use small ohmic resistors. However, the use of small ohmic resistors to form potential dividing circuit often results in huge losses in the resistors and therefore reduced lifetime and reliability for the system.

Also, many micropower generation systems, such as those in the home, typically comprise one or more of a number of solar cells (e.g. on the roof), wind turbines, combined heat and power systems and other like systems. The micropower generators generate electricity for the home, and the power is converted into useable voltage and current suitable for the home, for example 240V at 50 Hz or 110V at 60 Hz. However, more power than is actually required by the home is sometimes generated. If the micropower generation system were connected to the AC grid, from which power is normally drawn in conventional homes, this surplus power could be sent back to the AC grid.

However, there exists a need for a system of synchronising the power generated by the converters to the power on the grid. Inverters are often used to generate an AC output from a DC input. The inverters are generally located within the proximity of the power source (solar cells, wind turbine etc.). The point at which the inverter is connected to the AC grid mains is often remote from its physical location.

Inverters connected to the grid remotely may experience a phase shifted line voltage due to line impedance and therefore transfer an increased amount of reactive power in the network. The increase in reactive power implies minimised system efficiency.

There is therefore a need to enable the synchronisation of inverters to the same line voltage regardless of the line impedance between power switchboard and the point of connection of the inverter.

We describe techniques to address the above problems.

SUMMARY OF THE INVENTION

Grid Synchronisation

According to the present invention, there is provided a grid synchroniser to synchronise an AC output of an inverter to an AC grid mains, said inverter having a power input and an AC output for connection to said AC grid mains to provide a power supply input into said AC grid mains, the grid synchroniser comprising: an inverter controller to control said AC output of said inverter, said controller including a receiver to receive grid data from a grid sensor location remote from said inverter, said grid sensor sensing a grid characteristic of said AC grid mains, wherein said grid data comprises data relating to a grid characteristic of said AC grid mans sensed by a grid sensor, and wherein said inverter controller controls said AC output responsive to said grid data relating to said grid characteristic. Preferably, said sensed grid characteristic comprises a phase of said AC grid mains.

Therefore, the communication of the sensed grid characteristics of the AC grid mains (for example the phase of the current and/or voltage), enables the inverter to be controlled in order that its AC output is synchronised with that of the AC grid mains, irrespective of the line load between the inverter and the grid connection.

In embodiments, said receiver is in wired communication with a grid sensor. Preferably, said wired communication is through a power supply line. In alternative embodiments, said receiver is in wireless communication with a grid sensor.

In embodiments, the grid synchroniser further comprises an inverter sensor to sense an inverter characteristic of said AC output of said inverter and to transmit inverter data relating to said sensed inverter characteristic to a grid sensor located remote from said inverter. Preferably, said sensed inverter characteristic comprises one or more of a phase of said AC output of said inverter, a power output or a power efficiency of said inverter.

The present invention also provides a method of synchronising an AC output of an inverter to an AC grid mains, said inverter having a power input and an AC output for connection to said AC grid mains to provide a power supply input into said AC grid mains, the method comprising: sensing a characteristic of said AC grid mains using a grid sensor located remote from said inverter; transmitting grid data relating to said sensed grid characteristic to said inverter; and controlling said AC output of said inverter responsive to said grid data relating to said sensed grid characteristic. Preferably, said sensed grid characteristic comprises a phase of said AC grid mains.

Sensing and transmitting the sensed grid characteristics of the AC grid mains (for example the phase of the current and/or voltage), enables the inverter to be controlled in order that its AC output is synchronised with that of the AC grid mains, irrespective of the line load between the inverter and the grid connection.

Preferably, the method further comprises sensing a characteristic of said AC output of said inverter; and transmitting inverter data relating to said sensed inverter characteristic to said grid sensor. In embodiments, said sensed inverter characteristic comprises one or more of a phase of said AC output of said inverter, a power output or a power efficiency of said inverter.

The present invention also provides a system for micropower generation, the system comprising: an inverter having a power input and an AC output for connection to an AC grid mains to provide a power supply input into said AC grid mains; a sensor, remote from said inverter, to sense a grid characteristic of said AC grid mains and to transmit data relating to said sensed grid characteristic to said inverter, wherein said inverter includes a receiver to receive said transmitted data, said inverter being configured to control said AC output responsive to said data relating to said sensed grid characteristic. Preferably, said sensed grid characteristic comprises a phase of said AC grid mains.

Therefore, the communication of the sensed grid characteristics of the AC grid mains (for example the phase of the current and/or voltage), enables the inverter to be controlled in order that its AC output is synchronised with that of the AC grid mains, irrespective of the line load between the inverter and the grid connection.

Preferably, said sensor is configured to couple to said AC grid mains at a point where said AC output from said inverter is injected into said AC grid mains.

In embodiments, the system comprising a plurality of said inverters each inputting power into said AC grid mains at substantially the same point.

In embodiments, the system further comprises: an inverter sensor to sense an inverter characteristic of said AC output of said inverter and to transmit inverter data relating to said sensed inverter characteristic to a grid sensor located remote from said inverter. Preferably, said sensed inverter characteristic comprises one or more of a phase of said AC output of said inverter, a power output or a power efficiency of said inverter.

Driver Circuits and Techniques

According to another aspect of the present invention there is provided a driver circuit for switching on and off a semiconductor switching device connected to an alternating current (ac) power supply, said semiconductor switching device having first and second terminals, and a switching control terminal to control switching between said first and second terminals, the driver circuit being configured to derive from said ac power supply a control signal for application to said switching control terminal of said semiconductor switching device to control said switching, said driver circuit comprising: an input to receive a voltage derived from said ac power supply; a reference line for coupling to one of said first and second terminals of said semiconductor switching device; a rectifier having an input coupled to said input and an output; and a resistive element coupled between said output of said rectifier and said reference line; and a drive output for driving said switching control terminal of said semiconductor switching device, said drive output being coupled to a circuit node between said resistive element and said output of said rectifier.

In embodiments the resistive element comprises a resistor although the skilled person will appreciate that an FET may also be used as a resistive element. Preferred embodiments of the circuit include a voltage limiting element such as zener diode coupled between the circuit node and the reference line. This is particularly important when driving grid mains. Preferred embodiments also include a potential divider coupled to the input, the rectifier being coupled to an output of the potential divider. In embodiments the resistive element described above has a resistance of less than ⅕, more preferably less than ⅒ or less than 1/20 of a resistance value of an arm of the potential divider.

In embodiments of the circuit the semiconductor switching device comprises a MOSFET, IGBT, or Thyristor, more particularly a power device (that is a device with an operating or switching voltage capability of greater than 100 volts and/or a power rating of greater 1 watt).

In some preferred embodiments the ac power supply comprises a grid mains power supply and the semiconductor switching device has a breakdown voltage of at least 100 volts. The grid mains power supply may either be a domestic mains power supply such as a 110 volt or 230 volt power supply or a three phase power supply, typically operating at 415 volts.

The invention further provides a full-bridge or half-bridge rectifier circuit including one or more semiconductor switching devices and respective driver circuits as described above.

The invention further provides a power conditioning circuit with a dc input and an ac output for connection to an ac grid mains power supply. Then embodiments of the above-described driver circuit may be employed to drive a semiconductor switching device chopping a power supply derived from the dc input to provide an ac output to the grid mains supply. Some preferred embodiments of such a power conditioning circuit have two semiconductor switching devices driven by respective driver circuits, switching in alternate half cycles of the ac grid mains power supply.

Thus one or more driver circuits and switching devices as described above may be employed as one or more switches in a dc-to-ac power converter of a type described below:

A dc-to-ac power converter, the converter including a transformer having a primary and a secondary winding, the primary winding of said transformer being coupled to a dc input of said power converter and the secondary winding of said transformer being coupled to an ac output of said converter, and wherein the converter further comprises: a first pair of switches on said primary side of said converter, coupled between said dc input and said primary winding, to convert a dc supply from said dc input to an ac current for driving said transformer; a second pair of switches on said secondary side of said converter coupled between said secondary winding and said ac output, one in a forward path to said ac output and one in a return path from said ac output; a diode coupled across each of said secondary side switches; and a controller configured to control said primary and secondary side switches to convert a dc supply at said dc input to an ac supply at said ac output.

A DC-to-AC power converter, the converter including a transformer having a primary and a secondary winding, the primary winding of the transformer being coupled to a dc input of the power converter and the secondary winding of the transformer being coupled to an ac output of the converter, and wherein: a first and second switch connected to the primary winding of the transformer to convert a dc supply from the dc input to an ac current for driving the transformer; a first and second switch connected to the secondary winding of the transformer such that the first switch is in a forward path to the ac output and the second switch is in a return path to the ac output; a first and second diode coupled across the respective first and second switches connected to the secondary winding; and wherein the first switch connected to the primary winding of the transformer is controlled to provide a first half cycle of an ac voltage to the primary winding of the transformer; the second switch connected to the primary winding of the transformer is controlled to provide a second half cycle of an ac voltage to the primary winding of the transformer; and the first and second switches connected to the secondary winding of the transformer as switched to alternately conduct the first and second half cycles of the signal coupled from the primary winding of the transformer to the secondary winding of the transformer.

Further details of such circuits can be found in the applicant's co-pending UK and US patent applications GB 0612859.9 filed 29 Jun. 2006 and U.S. Ser. No. 11/771,593 filed 29 Jun. 2007 (both of which are hereby incorporated by reference in their entirety).

In a related aspect there is further provided a method of removing control terminal charge from a power semiconductor switching device, the method comprising supplying a drive signal to said control terminal of said power semiconductor switching device via a rectifier, and leaking current from said control terminal to a reference line whilst said power switching device is turned on.

In embodiments of the method the power semiconductor switching device comprises a MOSFET, IGBT or Thyristor; in embodiments the reference line comprises a ground line.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Grid Synchronisation

Figure 1:
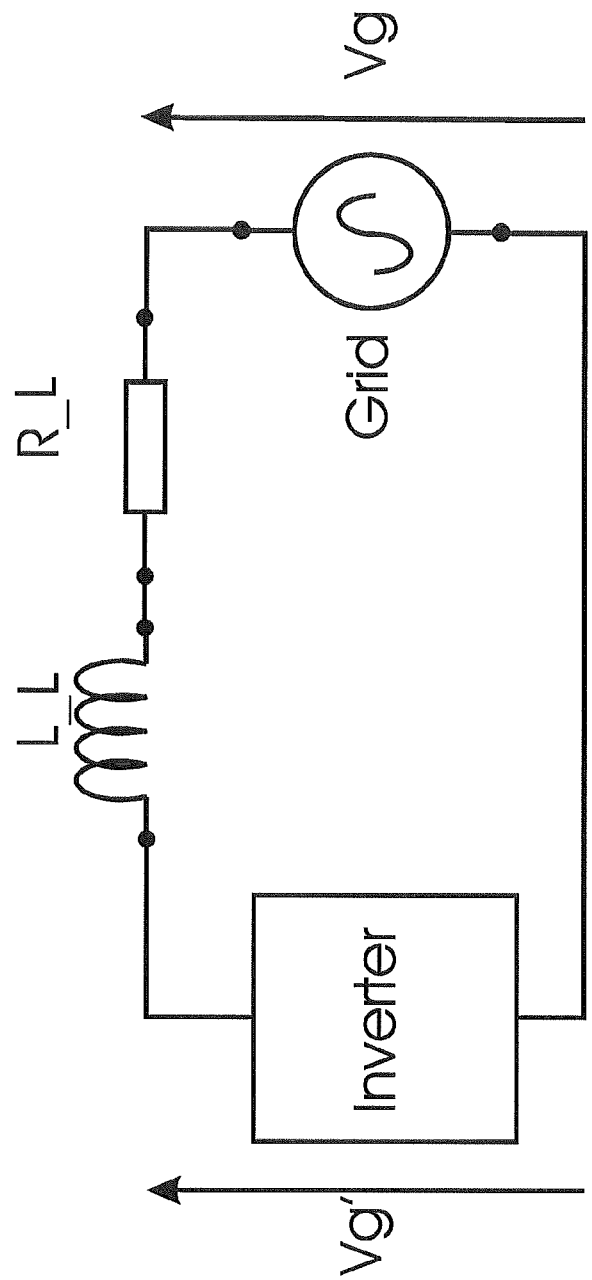
FIG. 1 shows a typical setup of an inverter connected to the AC grid mains.

FIG. 1 shows a typical setup of an inverter connected to the AC grid mains. The line connecting an inverter to the grid has both inductance L_L and dc resistance R_L associated with it and whose combined effect form line impedance Z_L. The line impedance is dependent on the length of the cable and the conductivity of the material. Due to the line impedance, the phase and magnitude of the grid voltage Vg differs from the phase and magnitude of the voltage Vg' that the inverter detects at its terminals. The difference between Vg and Vg' are dependent on the value of Z_L. For inverters connected to the grid and situated remotely such as on rooftop the impedance Z_L may be significant. The effect of this is that the inverter transfers current in phase with Vg' and not Vg.

Figure 2:
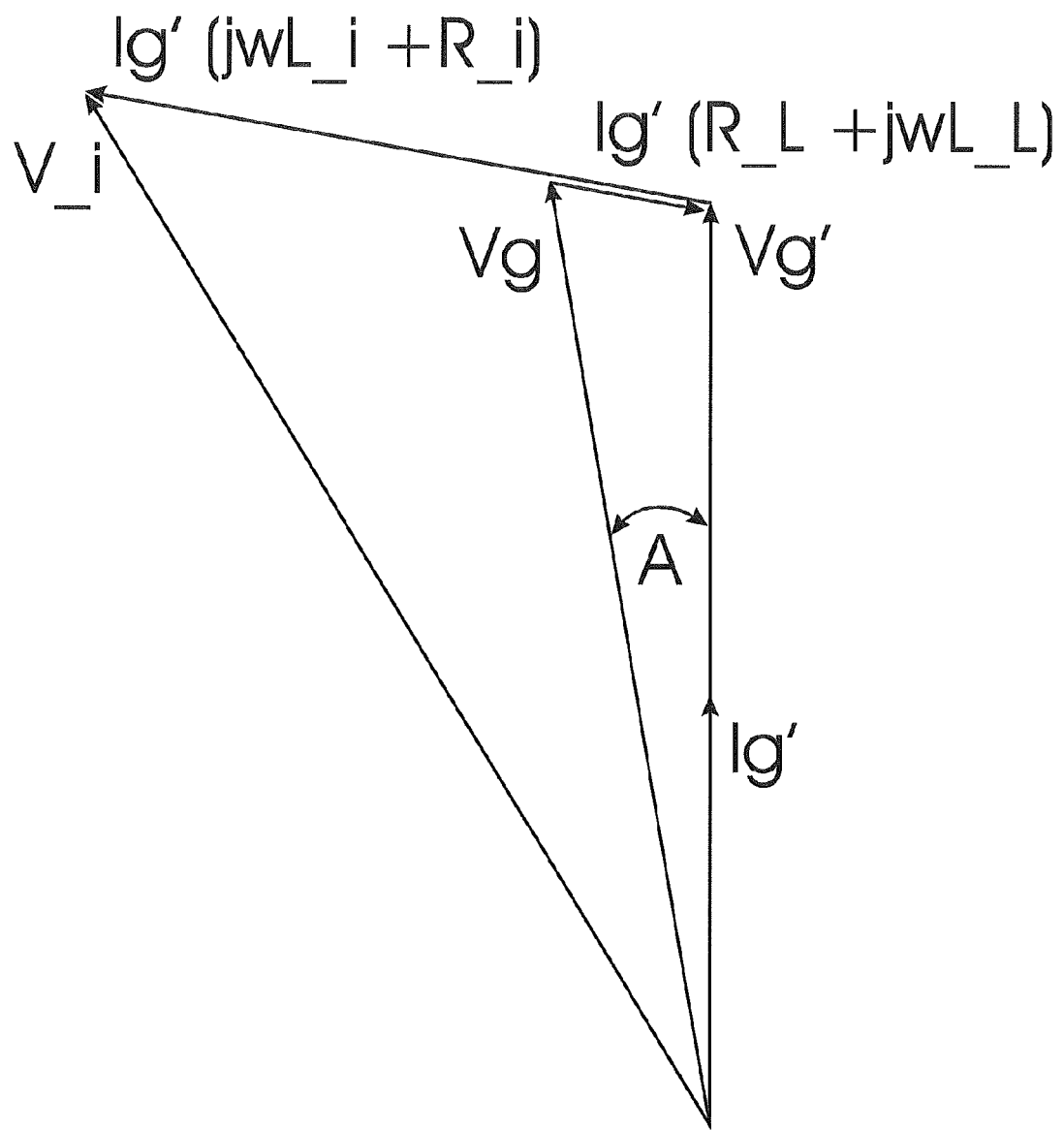
FIG. 2 shows the phasor diagram of the relationship between Vg and Vg'.

FIG. 2 shows the phasor diagram of the relationship between Vg and Vg', the inverter internal voltage V_i used to control current injection and the inverter output current Ig'. L_i and R_i represent the inverter internal impedance though which power is transferred onto the grid.

$$Vg'=Vg-Ig'(jw\,L\_L+R\_L) \qquad 1$$

The angle A represents the difference in phase between Vg and Vg'. The result of this phase difference is the transfer of reactive power between inverter and the grid. Reactive power is not converted into useful power but lost through parasitic resistance on the network. As a consequence the system efficiency is reduced.

Figure 3:
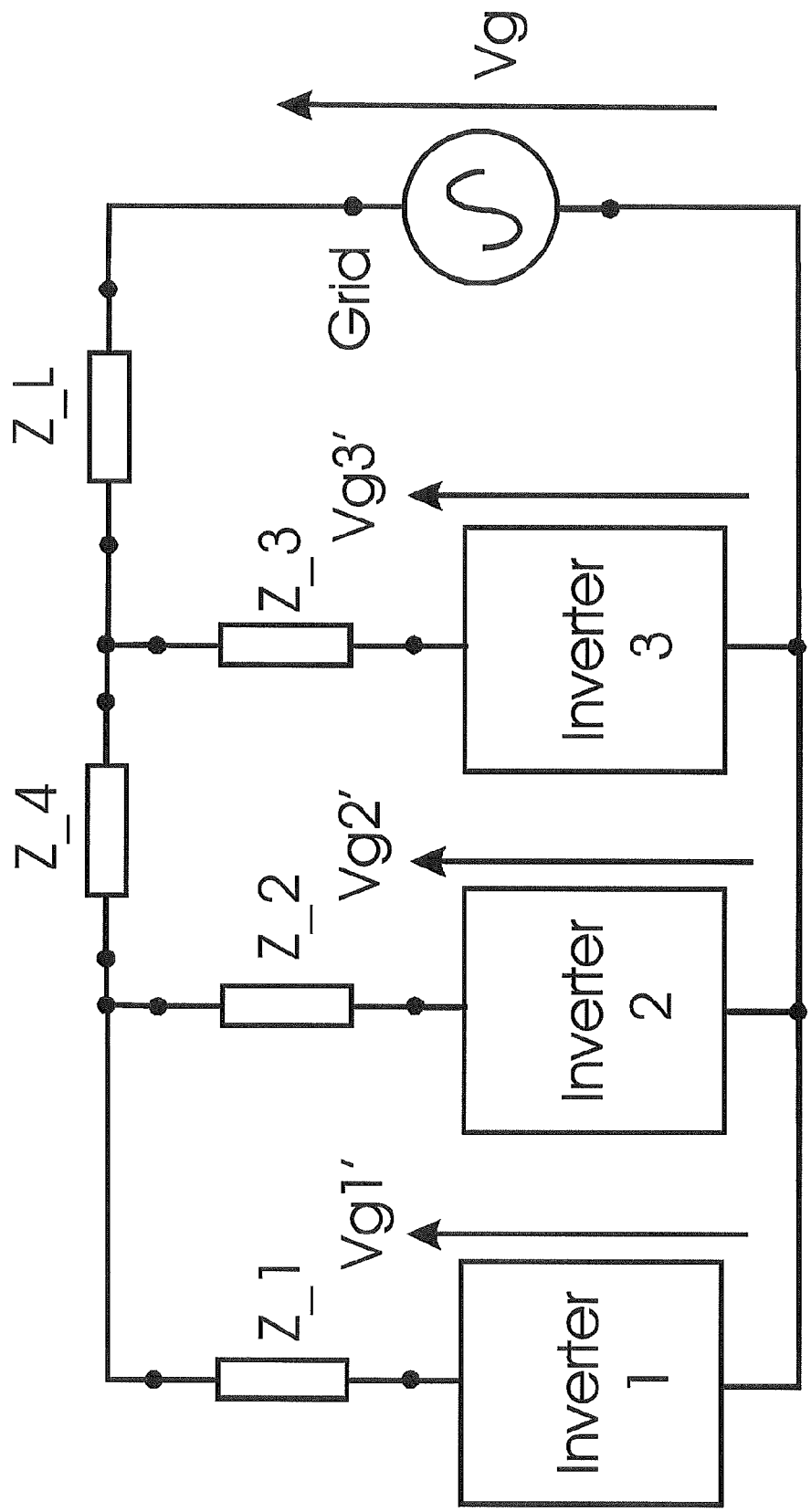
FIG. 3 illustrates a system with multiple inverters.

This effect of line impedance may be severe in systems with multiple inverters connected to the grid remotely. Each of the inverter may experience different values of line impedance and therefore different values of Vg'. FIG. 3 illustrates a system with multiple inverters.

$$Vg3'=Vg-(Ig1'+Ig2'+Ig3')Z\_L-Ig3'Z\_3 \qquad 2$$

$$Vg2'=Vg-(Ig1'+Ig2'+Ig3')Z\_L-(Ig1+Ig2')Z\_4-Ig2'Z\_2 \qquad 3$$

$$Vg1'=Vg-(Ig1'+Ig2'+Ig3')Z\_L-(Ig1'+Ig2')Z\_4-Ig1'Z\_1 \qquad 4$$

The three inverters in FIG. 3 all experience different values of grid voltage, Vg1', Vg2' and Vg3', due to the impedance in the line. The currents Ig1', Ig2' and Ig3' are generated by inverters 1, 2 and 3 respectively. The currents are assumed to be in phase with the corresponding inverter voltages. Equations 2, 3 and 4 show the relationships between each of the inverter voltages and the grid voltage.

Figure 4:
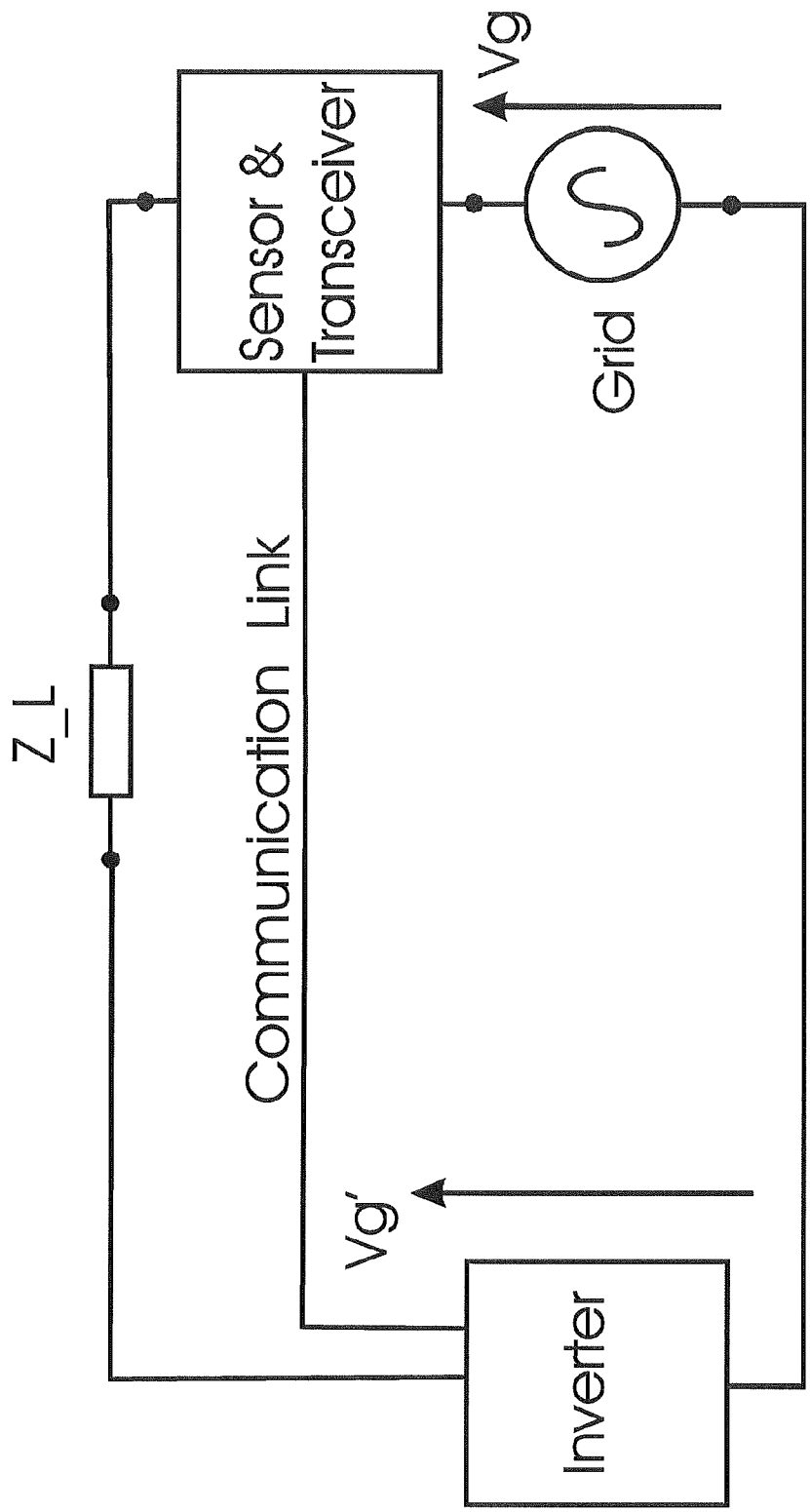
FIG. 4 shows the system according to the present invention.

FIG. 4 shows the proposed solution to the problem of reactive power transfer. A grid sensor, located at, or substantially near to the point at which power from the converter is injected onto the AC grid mains, is used to detect a number of characteristics of the AC grid mains, for example the current and/or grid voltage phases and frequency. This information is then communicated to the inverter, which is then used to control the current phase of the inverter such that the output current of the inverter is substantially synchronised to (i.e. in phase with) the voltage Vg.

Therefore, the communication of the sensed characteristics of the AC grid mains, namely the phase of the current and/or voltage, enables the inverter to be controlled in order that its AC output is synchronised with that of the AC grid mains. The object of control is the line current Ig flowing into the grid. The current is detected at the terminals of the grid supply and is therefore corrected from the effects of impedance on the system.

Figure 5:
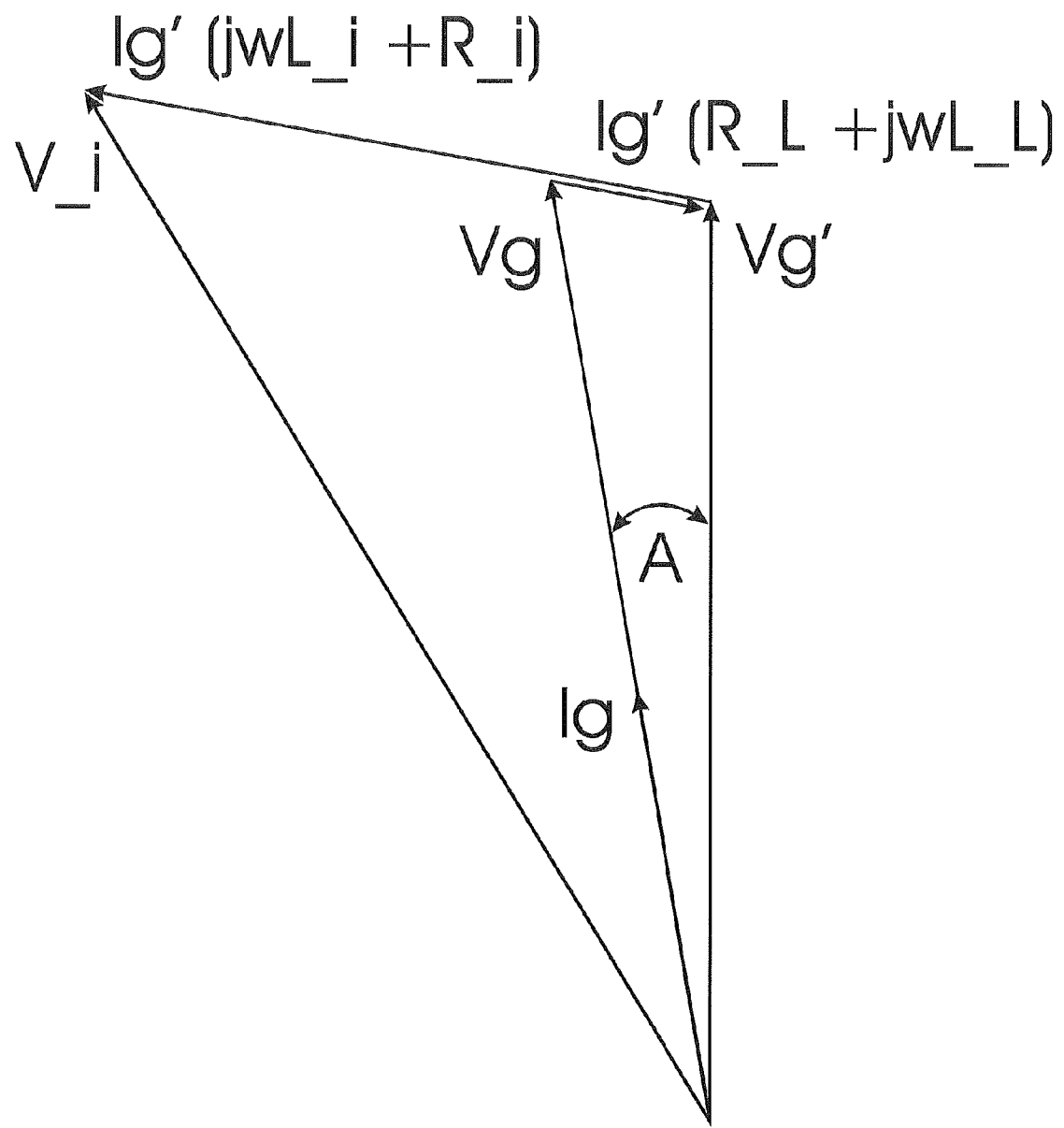
FIG. 5 shows the resulting desirable phasor relationship between the grid voltage and the inverter current for a single inverter network.

FIG. 5 shows the resulting desirable phasor relationship between the grid voltage and the inverter current for a single inverter network.

The communication system can be implemented either with the employment of a wireless network or a wired network. For example, in a wired network, low rate data may be sent down the power lines throughout the house ring main. In a wireless network, a radio protocol such as ZigBee, may be employed to communicate the data between the sensor and the inverter.

Many grid connected inverters come with some sort of communication capability already build in for data acquisition and fault diagnostic. It would be possible to build a synchronisation capability over the existing protocol in order to minimise costs. Alternatively, new protocols may be developed to communicate such data.

The grid sensor could be remote or local to the inverter. However, the grid sensor is preferably located at, or substantially near the point at which power from the output of the inverter is injected into the AC grid mains, for example at the house's switchboard. The sensor may be integrated into the switchboard in order to acquire phase and magnitude information of the grid current and voltage.

Figure 6:
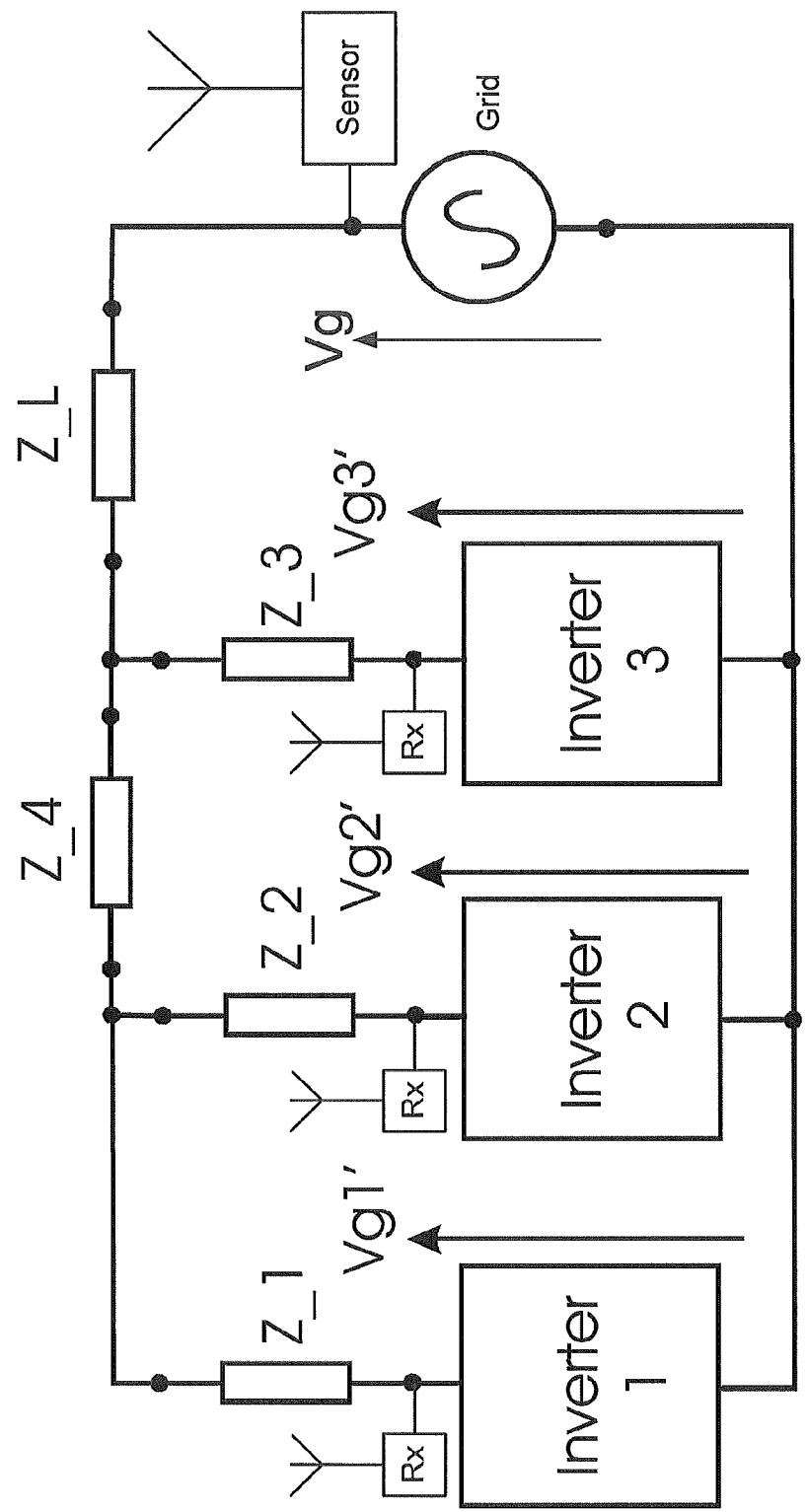
FIG. 6 shows a system of multiple inverters connected to the grid according to the present invention.

FIG. 6 shows a system of multiple inverters connected to the grid, and using the system of the present invention. The AC outputs of each of the inverters in the system can be synchronised to Vg regardless of the line impedance. As can be seen, each of the inverters has a receiver (here shown as a wireless receiver; the skilled reader would understand that a wired connection could be used instead) for receiving data from a single grid sensor located at, or substantially near to the point at which power generated from the inverters is injected into the AC grid mains. Each of the inverters is controlled in response to the data provided by the single grid sensor.

In an alternative embodiment, additional data may also be captured at the inverter, such as the output voltage and/or current, the DC or AC power input, the AC output, the efficiency of the inverter and other such data.

In another embodiment, the system could transmit such data from the inverter over the wired or wireless link back to the grid sensor. Such data would, for example, enable the grid sensor to detect if one or more of the inverters was malfunctioning, and to alert a user that action is required to correct such a fault.

In embodiments, the grid sensor arrangement could also collate data collected from the gird and/or the inverters and display such data to a user on a display. Such a display of data would enable a user to visualise that power being provided by the converter(s), the efficiency of the converts and/or how much power is being sent back to the grid at any time.

Driver Circuits and Techniques

We also describe a driver circuit that switches on and off a semiconductor device connected to the utility grid by using the grid voltage as the switching signal. The driver circuit addresses the aforementioned problem associated with removing charge quickly from the gate terminal of the semiconductor device when the grid voltage changes polarity. The rapid removal of charge from the gate terminal enables grid connection of devices with high gate charge density that are therefore slow switching. This in turn leads to the transfer of high power densities through the switching device. The driver circuit can be used in energy conversion systems such as solar photovoltaic and wind and in rectifier circuits connected to the utility grid or similar alternating current supplies.

Figure 7:
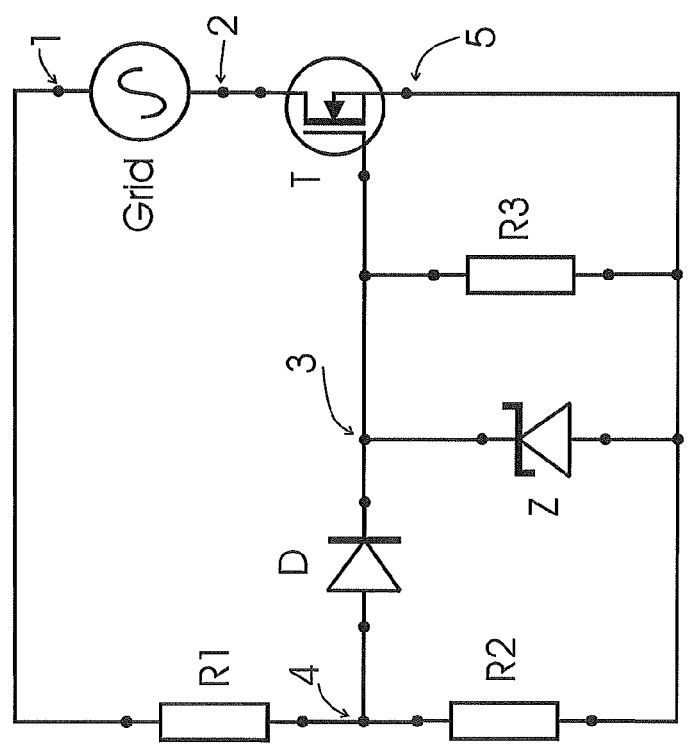
FIG. 7 shows a circuit diagram of a driver circuit according to an embodiment of the invention.

FIG. 7 shows the circuit solution. The circuit uses high value ohmic resistor R1 and therefore affords low potential divider losses. A low value resistor R3 is used to enable rapid removal of gate charge as the grid voltage drops to zero. The semiconductor switch T can be implemented as a MOSFET device, IGBT or Thyristor.

Principle of Operation

Assume the grid voltage Vgrid is zero, implying that the potential difference between point 1 and 2 in FIG. 1 is zero, and the potential difference between 2 and 5 is zero. Also assume the zener diode Z has a value Vz. The resistors R1 and R2 are chosen to have high value, example 1 mega ohm each. When the grid voltage rises from zero, that is a positive potential difference develops between 1 and 2, the voltage at point 4, V4, also increases. The diode D becomes forward biased and begins to conduct as V4 rises. The gate voltage Vgate, that is the potential between 3 and 5, therefore increases due to diode charge. As the grid voltage continues to rise, so does Vgate. The transistor T turns on when Vgate equals the turn on threshold of T. Vgate stays constant at Vz even when Vgrid rises further.

Vgate stays constant until V4 drops below Vz as Vgrid drops. There are two possibilities to the state of D when V4 drops below Vz. If the gate charge is removed rapidly, D would remain forward biased until Vgrid becomes zero. In this case T turns off before the Vgrid reverses polarity. On the other hand if the Vgate remains higher than V4, D is reverse biased. In this case there is a possibility that the MOSFET is on when Vgrid reverses. If this happens in, say, a half or full-bridge rectifier, the result is a short circuit in the power circuit.

Figure 8:
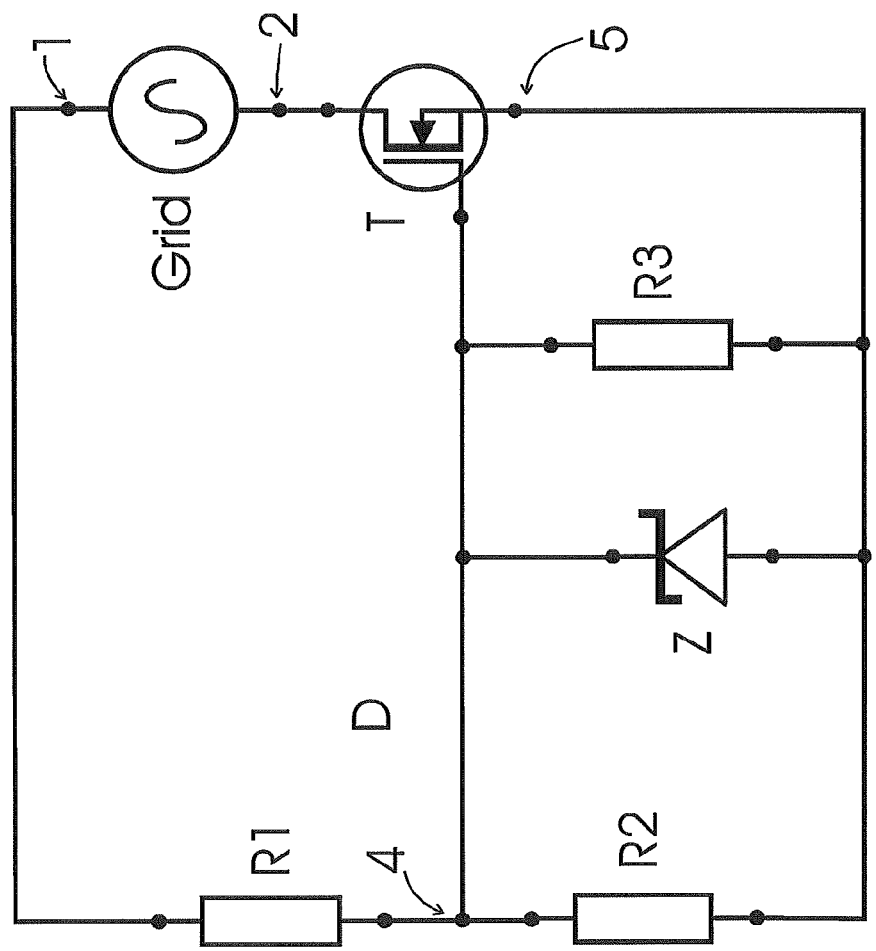
FIG. 8 shows a circuit diagram of a driver circuit omitting a rectifier, illustrating operation of the circuit of FIG. 7.

To remove charge rapidly, the value of resistor R3 is chosen to have a low value, for example 20 kilo ohm to 100 kilo ohm. This would enable the removal of charge rapidly and therefore enable high gate charge switches to be used. It is possible to have a low value of R3 across Vgate because of the blocking diode D. If D is short-circuited (as shown in FIG. 2, which is included to illustrate this) Vgate may not attain Vz for all or part of the half grid cycle and therefore the switch would not work properly. An example for the value of Vz that would result in normal operation of the switch is say 15V (this varies with the type of switching device). In mains driven circuits the zener diode is important. FIG. 8 illustrates a circuit with D replaced by a conducting wire.

In this case the resistors R2 and R3 form a parallel network with value equal to R2\*R3/(R2+R3). FIG. 3 shows the resulting gate drive signals with and without the diode D connected.

Figure 9:
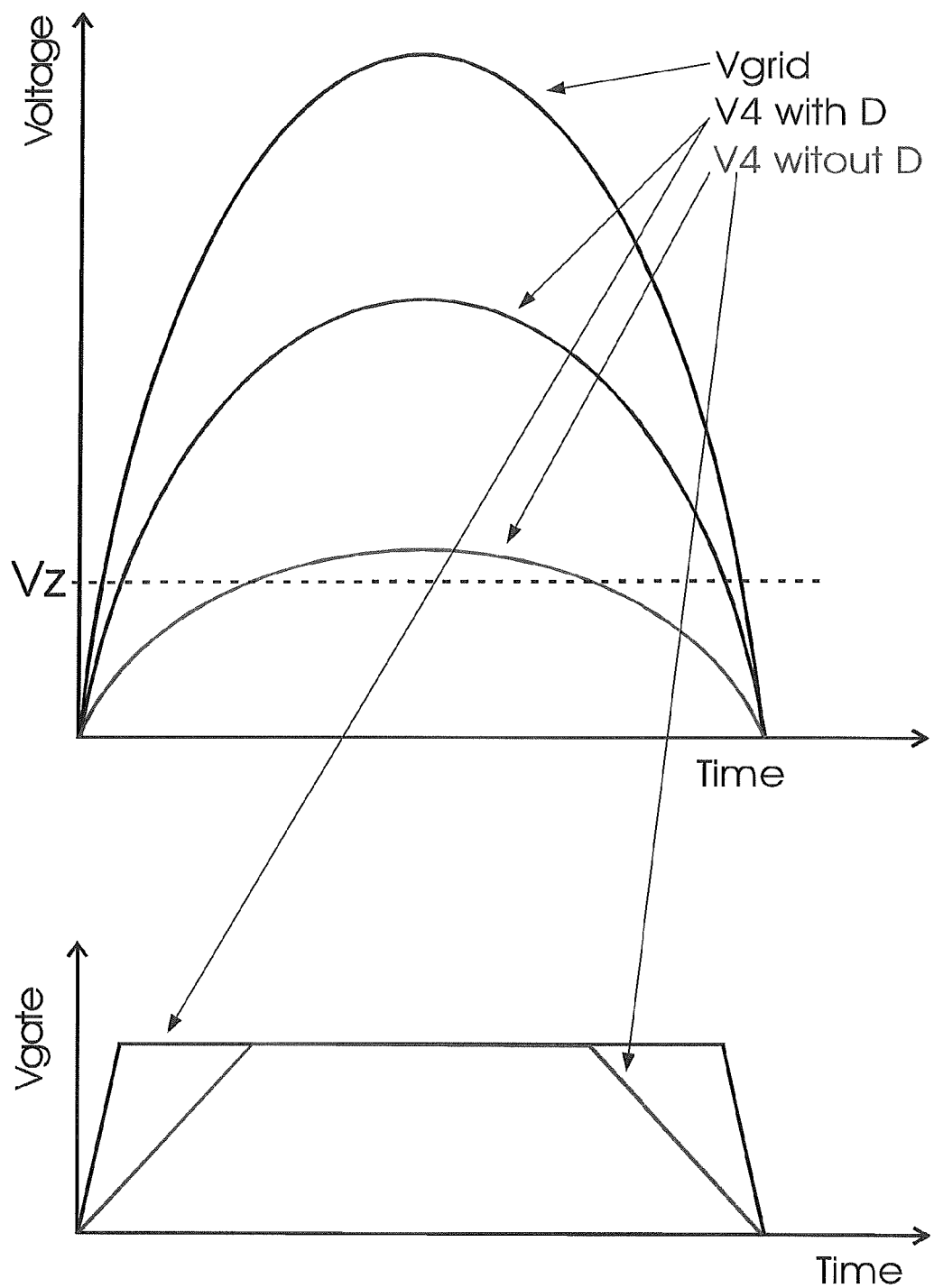
FIG. 9 shows graphs of effective input voltage to the driver circuit over a half-cycle of ac grid mains for circuits with and without a rectifier and lacking a zener diode (upper) and with a zener diode (lower)

FIG. 9 shows graphs of effective input voltage to the driver circuit over a half-cycle of ac grid mains for circuits with and without a rectifier and lacking a zener diode (upper) and with a zener diode (lower).

Gate Charge and Shoot-Through

Figure 10:
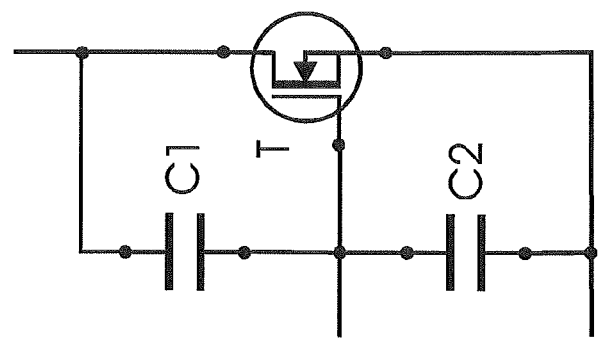
FIG. 10 shows, schematically, leakage capacitances of a MOSFET.

The gate drive circuit has the ability to discharge the gate terminal of the connected switching device rapidly, therefore preventing short-circuiting the grid when the grid voltage reverses. Switching devices such as MOSFET have parasitic gate capacitances that store charge. FIG. 10 shows a representation of the MOSFET with drain-to-gate and gate-to-source parasitic capacitors.

The charge stored in the combined capacitance C1 and C2 is discharged through R3 and through some leakage current in the MOSFET and the zener diode. The time constant for the discharge assuming that the diode D stays reverse biased is given by equation 1.

$$T=1/(C\ R3+C\ RL)$$

were C is the overall gate capacitance and RL is the leakage resistance due to the MOSFET and zener diode. This equation also indicates that a small R3 reduces T.

Figure 11:
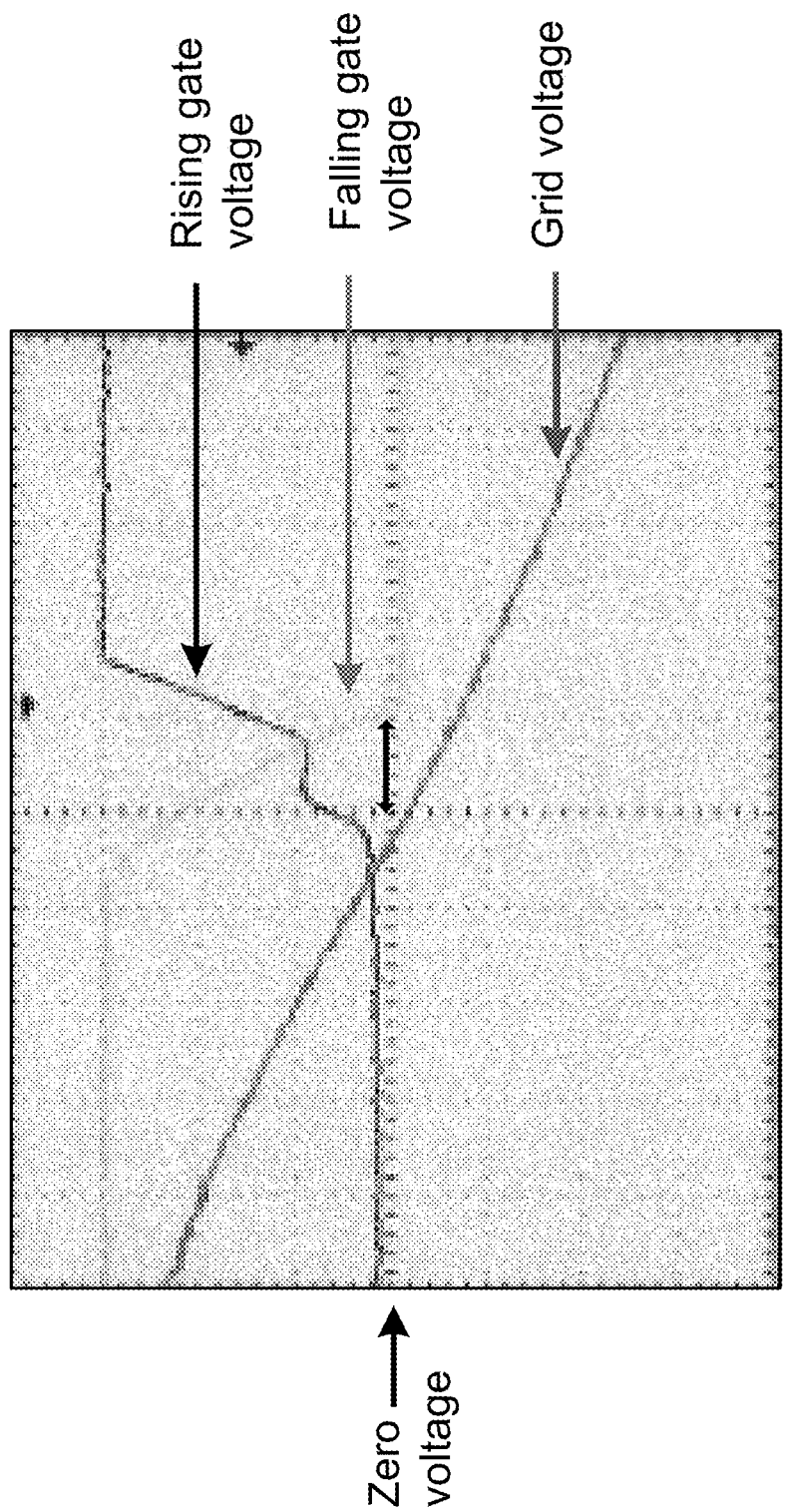
FIG. 11 shows measured waveforms from a circuit similar to that illustrated in FIG. 8.
Figure 12:
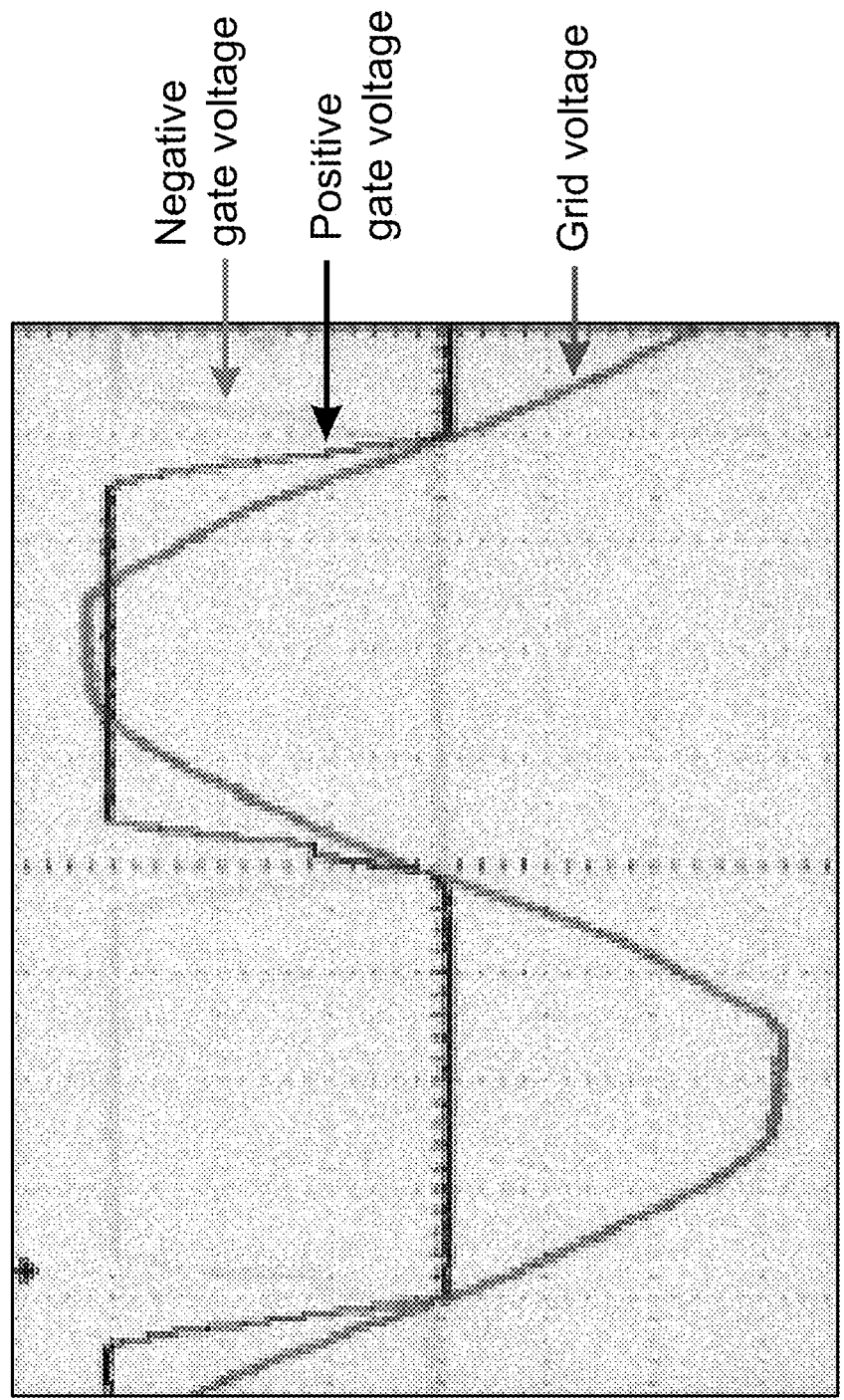
FIG. 12 shows waveforms from circuits similar to that illustrated in FIG. 7.

FIG. 11 shows some experimental results obtained when the gate circuit is designed without the diode D and the resistor R3. In the figure, it can be observed that the falling gate voltage overshoots the zero-crossing point of the grid by a significant amount to cause short circuit when the other half cycle rises (see the double-ended arrow). FIG. 12 shows the results obtained when D and R3 are included in the design. In this case the gate signals fall rapidly enough to avoid any significant overshoot.

APPLICATION EXAMPLES

Figure 13:
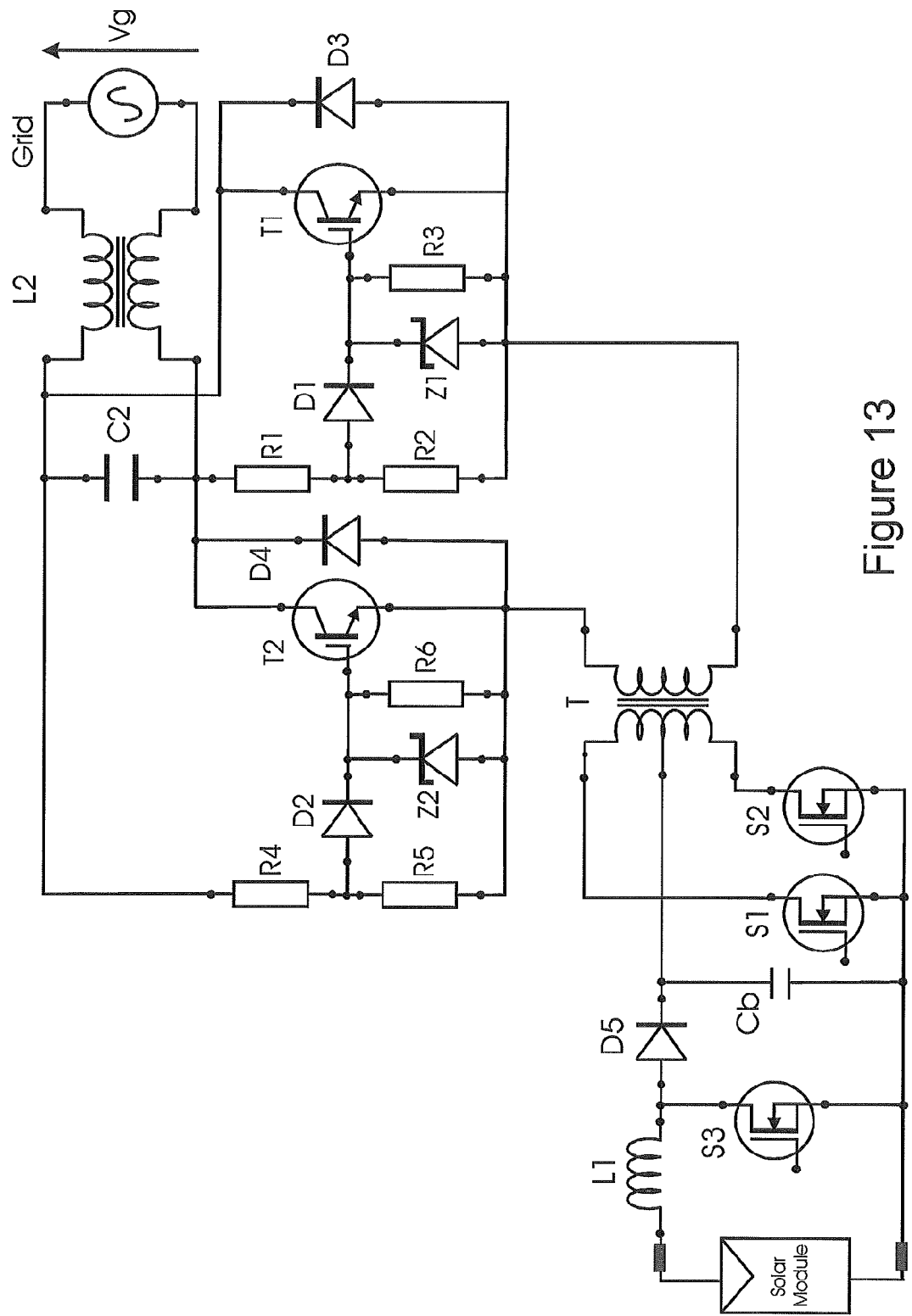
FIG. 13 shows a circuit of a dc-to-ac power converter comprising four switches (two on a transformer primary side, two on a transformer secondary side) incorporating secondary-side driver circuits according to an embodiment of the invention.

The driver circuits can be used in applications where synchronised switching of the grid is used for power transfer in either direction. One example is as used in the circuit diagram of FIG. 13. The principle of operation of this circuit is described in our earlier patent application (ibid). In this circuit the drivers switches the two IGBTs in alternate half cycles to allow power transfer from a source such as solar photovoltaic energy.

Figure 14:
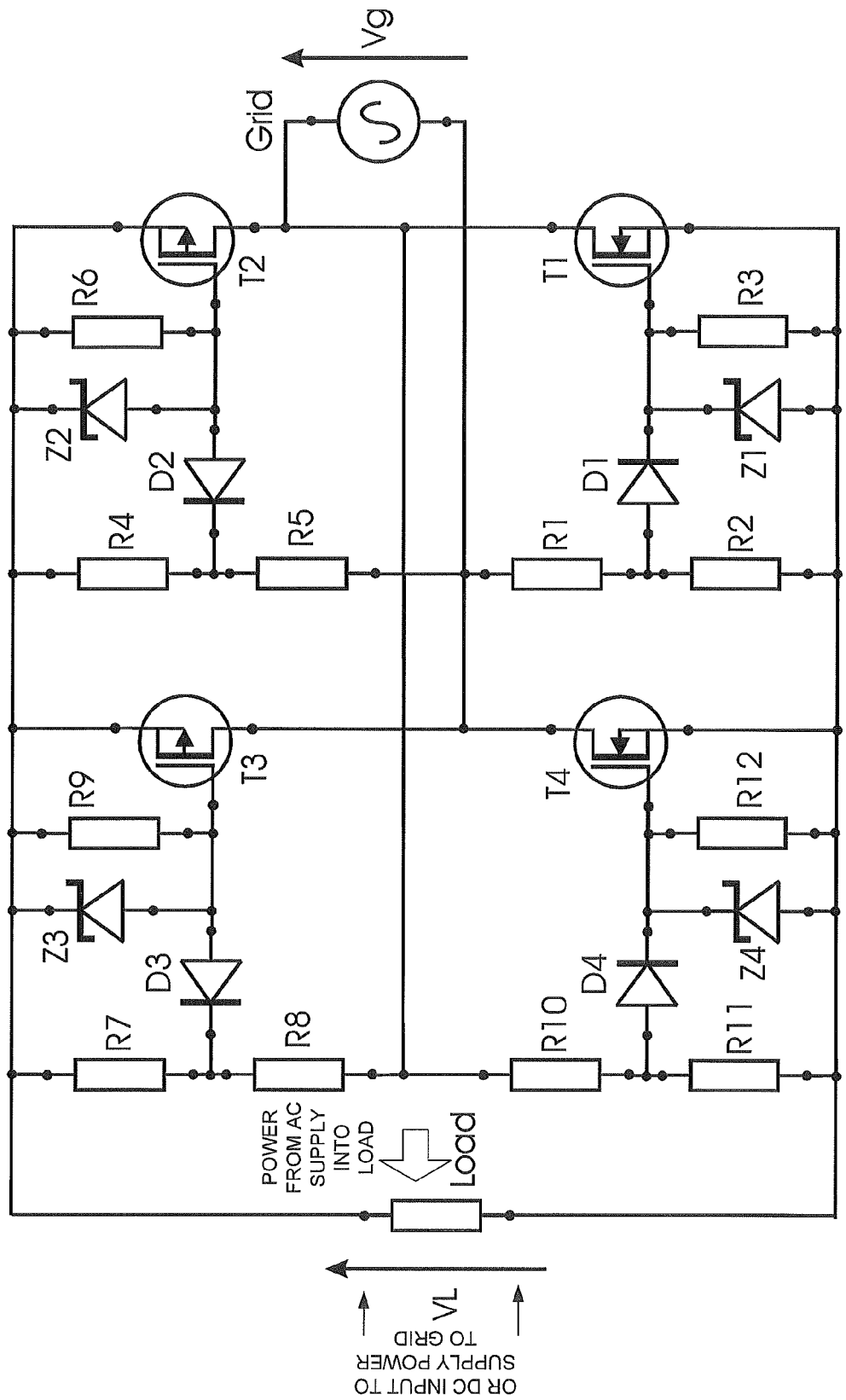
FIG. 14 illustrates an example of a full-bridge rectifier circuit incorporating switching devices with switching controlled by an ac grid mains supply to which the circuit is connected, for either receiving power from a mains supply and delivering power to a load or for receiving a dc power input and providing an ac power output to a mains supply.
Figure 15:
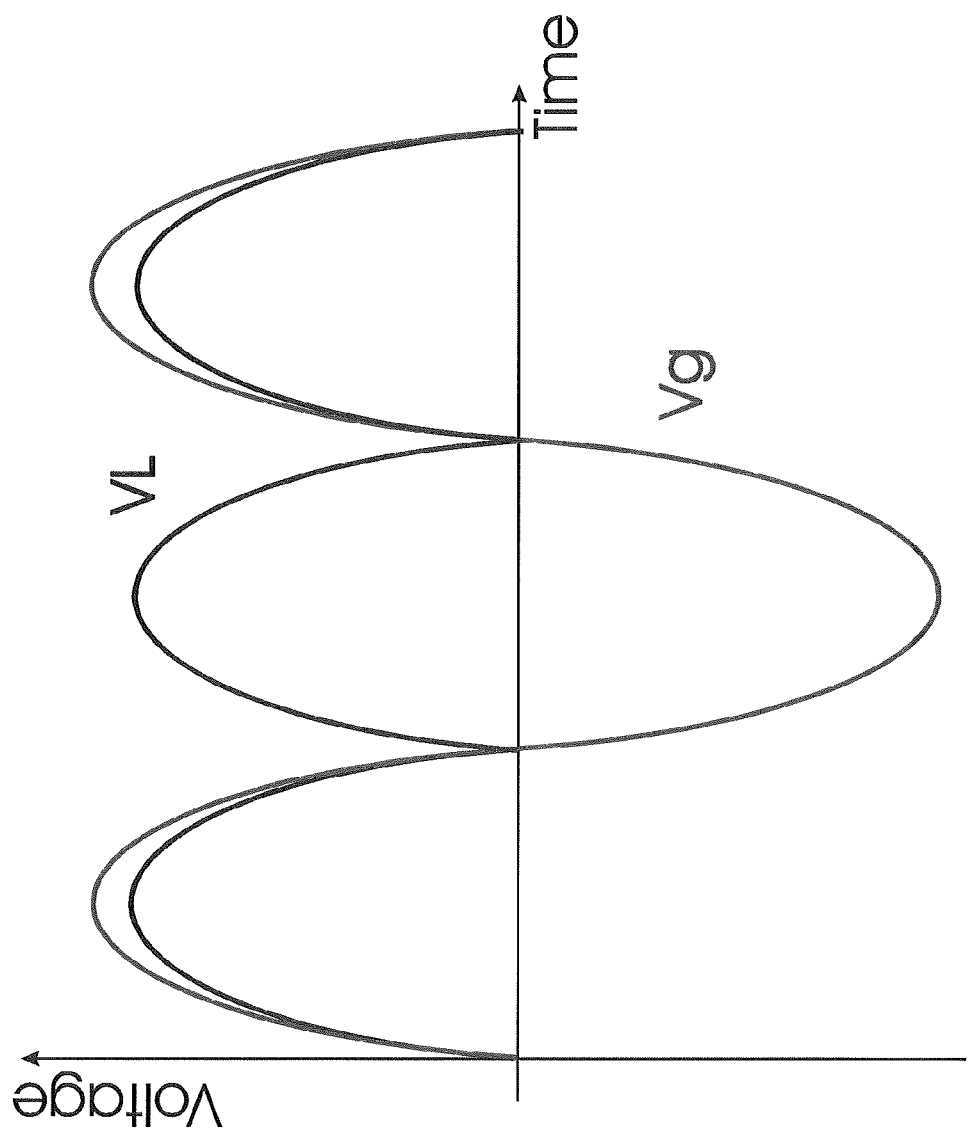
FIG. 15 shows waveforms illustrating the operation of FIG. 14.

FIG. 14 shows another application of the proposed driver circuit. In this case power can be transferred from the grid to the load or the load can supply power to the grid. FIG. 15 illustrates the waveforms appearing across the load. The amplitude difference between Vg and VL are for illustration clarity.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system comprising:
   a plurality of inverters, each for converting direct current (DC) power to an alternating current (AC) output power having a current phase and for outputting the AC output power to an AC mains power supply, each inverter comprising a controller for controlling the AC output power from the inverter to the AC mains power supply;
   a plurality of cables for coupling an inverter of the plurality of inverters to the AC mains power supply, each cable comprising a line impedance that is different from other cables of the plurality of cables; and
   a grid sensor, coupled between the plurality of cables and the AC mains power supply, for sensing a set of grid characteristics comprising a modified current phase based on the different line impedances of the plurality of cables and a voltage phase of a line voltage of the AC mains power supply,
   wherein each of the plurality of inverters has a receiver configured to receive the set of grid characteristics from the grid sensor; and
   wherein each controller controls the AC output power from a respective inverter of the plurality of inverters by adjusting the current phase of the AC output power from the respective inverter to match the modified current phase.

2. The system of claim 1, wherein matching the modified current phase comprises overcoming the line impedance of a respective cable of the plurality of cables.

3. The system of claim 1, wherein the receiver is configured to receive the set of grid characteristics from the grid sensor over a wired communication network.

4. The system of claim 3, wherein the wired communication network communicates data through the plurality of cables.

5. The system of claim 1, wherein the receiver is configured to receive the set of grid characteristics from the grid sensor through a wireless communication network.

6. The system of claim 1, wherein each inverter of the plurality of inverters further comprises:
   an inverter sensor for sensing inverter data comprising a set of inverter characteristics of the respective inverter.

7. The system of claim 6, wherein the set of inverter characteristics comprises at least one of the current phase of the AC output power of the respective inverter, a power output of the respective inverter and a power efficiency of the respective inverter.

8. A system for micropower generation, the system comprising:
   a plurality of inverters, each inverter for converting direct current (DC) power from a power input to an alternating current (AC) output power having a current phase and for outputting the AC output power to an AC grid mains to provide the AC output power into the AC grid mains;
   a plurality of cables for connecting each inverter of the plurality of inverters to the AC grid mains, each cable of the plurality of cables comprising a line impedance that is different from other cables of the plurality of cables; and
   a grid sensor, remote from the plurality of inverters and used for sensing a set of grid characteristics of the AC grid mains and for wirelessly transmitting grid data relating to the sensed set of grid characteristics to each inverter of the plurality of inverters;
   wherein the set of grid characteristics comprises a modified current phase based on the line impedances of each of the plurality of cables and a voltage phase of a line voltage of the AC mains power supply; and
   wherein each inverter comprises a wireless receiver for receiving the transmitted grid data that the inverter uses to control the AC output power by adjusting the current phase of the AC output power to match the modified current phase.

9. The system of claim 8, wherein matching the modified current phase comprises compensating for the line impedance of a respective cable of the plurality of cables.

10. The system of claim 8, wherein the grid sensor is connected to the plurality of cables at a point where the AC output power from each of the plurality of inverters is combined and injected into the AC grid mains.

11. The system of claim 8, wherein the wireless receiver receives the transmitted grid data from the grid sensor through a wireless communication network.

12. The system of claim 8, wherein each inverter of the plurality of inverters further comprises:
   an inverter sensor for sensing inverter data comprising a set of inverter characteristics of a respective inverter in order for the respective inverter to transmit the inverter data to the grid sensor located remote from the respective inverter.

13. The system of claim 12, wherein the set of inverter characteristics comprises at least one of the current phase of the AC output power of the respective inverter, a power output of the respective inverter and a power efficiency of the respective inverter.

14. A method comprising:
coupling a plurality of inverters to an alternating current (AC) grid mains through a plurality of cables:
converting, using the plurality of inverters, direct current (DC) power to an AC output power having a current phase;
transmitting the AC output power over the plurality of cables to the AC grid mains, each cable comprising a line impedance that is different from other cables of the plurality of cables;
receiving with a receiver disposed within each of the plurality of inverters a set of grid characteristics from a remote grid sensor that is coupled between the plurality of cables and the AC grid mains, the set of grid characteristics comprising a modified current phase based on the line impedance of each of the plurality of cables and a voltage phase of a line voltage of the AC grid mains; and altering a current phase of the AC output power based on the set of grid characteristics in order to match the modified current phase.

15. The method of claim 14, wherein matching the modified current phase comprises overcoming the line impedance of each of the plurality of cables.

16. The method of claim 14 further comprising, at each inverter of the plurality of inverters:

sensing inverter data comprising a set of inverter characteristics of the AC output power of a respective inverter; and transmitting the sensed inverter data to the remote grid sensor.

17. The method of claim 16, wherein the set of inverter characteristics comprises at least one of a phase of the AC output power, a power output of the respective inverter and a power efficiency of the respective inverter.

* * * * *